US012100906B2

(12) United States Patent
Clor, III et al.

(10) Patent No.: US 12,100,906 B2
(45) Date of Patent: Sep. 24, 2024

(54) REVERSIBLE CIRCUIT BOARD FOR SINGLE AND DUAL MANIFOLD SOLENOID VALVE ASSEMBLY

(71) Applicant: Asco, L.P., Novi, MI (US)

(72) Inventors: Anthony G. Clor, III, Highland, MI (US); Bradly J. Atkin, Stockbridge, MI (US)

(73) Assignee: ASCO, L.P.

( * ) Notice: Subject to any disclaimer, the term of this patent is extended or adjusted under 35 U.S.C. 154(b) by 330 days.

(21) Appl. No.: 17/785,755

(22) PCT Filed: Jan. 2, 2020

(86) PCT No.: PCT/US2020/012060
§ 371 (c)(1),
(2) Date: Jun. 15, 2022

(87) PCT Pub. No.: WO2022/164416
PCT Pub. Date: Aug. 4, 2022

(65) Prior Publication Data

US 2023/0163499 A1 May 25, 2023

(51) Int. Cl.
*H01R 12/72* (2011.01)
*H01R 12/71* (2011.01)

(52) U.S. Cl.
CPC ......... *H01R 12/721* (2013.01); *H01R 12/716* (2013.01)

(58) Field of Classification Search
CPC ................ H01R 12/721; H01R 12/716; F15B 2013/006; F15B 13/0839; F15B 13/0853; F15B 13/0857; F15B 13/0814
USPC ........................................................ 439/620
See application file for complete search history.

(56) References Cited

U.S. PATENT DOCUMENTS

| | | | | |
|---|---|---|---|---|
| 6,053,198 | A | 4/2000 | Atkin et al. | |
| 6,164,335 | A | 12/2000 | Hayashi et al. | |
| 6,173,745 | B1 | 1/2001 | Hayashi et al. | |
| 6,256,185 | B1 | 7/2001 | Maller | |
| 7,171,985 | B2 * | 2/2007 | Eltrop | F15B 13/0839 137/884 |
| 7,315,440 | B1 | 1/2008 | Guo | |

(Continued)

FOREIGN PATENT DOCUMENTS

EP 1041327 A2 10/2000

OTHER PUBLICATIONS

Extended EP Search Report, Application No. 20968178.2-1012, Applicant: Asco, L.P., Dated: Sep. 5, 2023.

(Continued)

*Primary Examiner* — Alexander Gilman
(74) *Attorney, Agent, or Firm* — Reising Ethington P.C.

(57) ABSTRACT

A fluid valve manifold has an electrical conduit for receiving a circuit board assembly that actuates a plurality of valve units. The circuit board assembly is reversibly and rotatably mountable to a first position or second position in the electrical conduit such that a respective set of first electrical connectors at a first end or a second set of electrical connectors at a second end opposite that of the first end may be in position to receive electrical signals through the respective connectors. When in one position, the circuit board assembly is able to serve a single solenoid valve unit. When in a rotated second position, the circuit board is able to serve a double solenoid valve unit.

14 Claims, 4 Drawing Sheets

(56) References Cited

U.S. PATENT DOCUMENTS

| | | | | |
|---|---|---|---|---|
| 7,813,101 | B2 | 10/2010 | Morikawa | |
| 7,849,881 | B2 | 12/2010 | Lee et al. | |
| 9,004,108 | B2 * | 4/2015 | Okamoto | F16K 31/06 700/282 |
| 9,488,990 | B2 * | 11/2016 | Morikawa | F15B 20/008 |
| 10,006,557 | B2 | 6/2018 | De Carolis et al. | |
| 10,180,191 | B2 * | 1/2019 | Atkin | F15B 13/044 |
| 11,408,450 | B2 * | 8/2022 | De Carolis | F15B 13/0867 |
| 2009/0045367 | A1 * | 2/2009 | Lee | F15B 13/0839 251/129.15 |
| 2009/0212247 | A1 * | 8/2009 | Inaba | F16K 31/426 251/129.15 |
| 2012/0085953 | A1 * | 4/2012 | Kato | F15B 13/0842 251/129.15 |
| 2012/0097282 | A1 * | 4/2012 | Coombs | F15B 13/0814 137/861 |
| 2015/0369380 | A1 * | 12/2015 | De Carolis | F16K 31/0675 137/625 |
| 2017/0097102 | A1 * | 4/2017 | Atkin | F15B 13/044 |
| 2018/0023718 | A1 * | 1/2018 | De Carolis | F16K 31/02 137/625 |
| 2019/0253273 | A1 * | 8/2019 | Forcht | H04L 12/40182 |

OTHER PUBLICATIONS

Canadian Office Action, Application No. 3, 163,616, Applicant: Asco, L.P., Title: A Reversible Circuit Board for Single and Dual Manifold Solenoid Valve Assembly, Dated: Dec. 14, 2023.

PCT International Search Report and Written Opinion, Int. Serial No. PCT/US20/012060, Int. Filing Date: Jan. 2, 2020, Applicant: Asco, L.P., Date: May 1, 2020.

* cited by examiner

REVERSIBLE CIRCUIT BOARD FOR SINGLE AND DUAL MANIFOLD SOLENOID VALVE ASSEMBLY

TECHNICAL FIELD

This invention relates to a printed circuit board assembly for a manifold solenoid valve assembly.

BACKGROUND OF THE DISCLOSURE

Manifold solenoid valve assemblies are commonly used in an industrial line to selectively direct pneumatic pressure to various pneumatically operated field devices. The manifold assembly is commonly modular and is assembled from a plurality of individual fieldbus modules including I/O modules, a communication module, and valve manifold members. The manifold member includes one or more control valves in a housing mounted onto a manifold block. The control valves often include a spool valve that slides in a cylinder cavity and is operated by pilot pressure that is selectively provided by a solenoid coil and valve assembly when the solenoid coil is actuated.

The spool valve may either be actuated to one position (usually actuated) by a single solenoid valve and a spring may return the spool valve to a second position (usually de-actuated). The power to the single solenoid control valve needs to be continuously on to maintain the spool valve in the actuated position. Because of their power requirements, the single solenoid valves are most commonly used when the actuated position is on for a brief amount of time. Another common type of spool valve is controlled by two solenoid valves where the first solenoid actuates the spool valve to a first position and the second solenoid drives the spool valve to a second position. While the addition of the second control valve may add cost, there is an energy savings in that only a pulse of energy is needed to drive the spool valve to each position. In other words, the control valves do not need to be continuously on to maintain the spool in either the actuated or the deactuated position.

The manifold assemblies have the capacity to incorporate many manifold blocks and valve stations connected together which operate many remote field devices in a large manufacturing or industrial line. As such, there exist many differently sized manifold banks with one, two, or more solenoid valve stations and thus many differently sized printed circuit board assemblies built for the differently sized manifold banks. In addition, the printed circuit board assemblies besides being appropriately sized also need to control either a single solenoid valve station or a double solenoid valve station. As a consequence, this multitude of differently sized printed circuit board assemblies for both single and double solenoid valve stations creates an inventory problem.

Often these printed circuit boards have traces i.e. lines with decremented contacts at each end so that the output electrical contacts are stepped down to connect to a sequential printed circuit board. For example, U.S. Pat. No. 10,006,557 to DeCarolis discloses the general layout of a circuit board for multiple valve stations having electrical connectors and traces on both surfaces of the circuit board that have either single or double decrements for each valve station to accommodate either single or double solenoid valves but not both on the same board.

Attempts have been made to produce reversible printed circuit boards in order to simplify the switching between single-type valve and double-type solenoid valves. These previous attempts still had unacceptable complications. The reversibility was accomplished by flipping the entire board end over end to accommodate either single or double solenoids. These flippable boards thus require electrical connectors on both surfaces of the board to connect to the solenoid valve. In addition, a separate intermediate connector needs to be attached to the selected connector on the appropriate surface of the circuit board. These two features add expense and inconvenience, furthermore, these flippable boards are not suitable for use with boards that have pin assemblies permanently mounted on one surface of the printed circuit board.

What is desired is to provide an expeditiously constructed and easily usable printed circuit board assembly that can accommodate both single and double solenoid valve banks whereby the inventory needs of printed circuit boards may be greatly reduced.

SUMMARY OF THE DISCLOSURE

In accordance with one aspect of the invention, a fluid valve manifold has an electrical conduit for receiving a circuit board assembly that actuates a plurality of valve units mounted to the fluid valve manifold. The circuit board assembly has a circuit board commonly referred to as a printed circuit board with electrical connectors thereon. The circuit board assembly is reversibly mountable to a first position or second position in the electrical conduit such that a respective set of first electrical connectors at a first end or a second set of electrical connectors at a second end opposite that of the first end may be in position to receive electrical signals through the respective connectors. The circuit board has a set of conductive valve lines connected to and extending between the respective set of first electrical connectors and the set of second electrical connectors at opposite first and second ends of the circuit board.

When the board is in the first position, conductive valve line extends from a respective first electrical connector to a third connector on a first surface of the circuit board operably leading to one voltage side of the valve unit that serves a single solenoid valve unit. A conductive common line that extends from the first electrical connector to the second electrical connector is operably connected to an opposite voltage side of the single solenoid valve unit at the third connector when the circuit board assembly is in the first position.

When the board is in the second position, two conductive valve lines extend from respective second electrical connectors to the third connector leading to one voltage side of the valve unit to serve a double solenoid valve unit. The conductive common line is operable connected to an opposite voltage side of the double solenoid valve unit at the third connector when the circuit board assembly is in the second position. Preferably, the third connector is mounted on the first surface of the circuit board at a central longitudinal axis of the circuit board. In one embodiment, a plurality of third connectors are all mounted along the central longitudinal axis of the circuit board and are symmetrically positioned about a central transverse axis along the width of the circuit board.

In one embodiment, the set of conductive valve lines includes a set of single solenoid valve lines extending from the first electrical connector and decremented one step to the second electrical connector for each third connector installed on the circuit board. The set of conductive valve lines includes a set of double solenoid valve lines extending from the second electrical connector to the first electrical connector and decremented two steps for each third connector installed on the circuit board.

Preferably, the sets of single solenoid valve lines and double solenoid valve lines that connect to the third connectors are both on the first surface of the circuit board.

Preferably, the sets of single solenoid valve lines and double solenoid valve lines that do not connect to the third connector are on both surfaces of the circuit board.

Preferably, the second electrical connector of the circuit board is constructed to be connectable to a first electrical connector of a sequentially connected circuit board and the first electrical connector of the circuit board is constructed to be connectable to a second electrical connector of a sequentially connected circuit board. A communication circuit line is on one of the surfaces of the circuit board and extends from the first electrical connector to the second electrical connector without any decrementation.

In accordance with another aspect of the invention, a circuit board assembly for a fluid valve manifold includes a circuit board assembly with a plurality of connectors on a surface of a circuit board for connection to at least one valve unit mounted to the fluid valve manifold. The circuit board assembly has a plurality of electrically conductive valve lines extending from one end to a second end being reversibly mountable to a first position or second position in with a valve unit such that a respective set of first electrical connectors at a first end or a second set of electrical connectors at a second end opposite that of said first end may be in position to receive electrical signals through said respective connectors.

When the circuit board assembly is in the first position, a conductive valve line extends from a respective first electrical connector to a third connector of the circuit board operably connectable to one voltage side of the valve unit to serve a single solenoid valve unit. A conductive common line is also extending to the first electrical connector and second electrical connector connected to said third connector being operably connectable to an opposite voltage side of the valve unit.

When said circuit board assembly is in the second position, two conductive valve lines extend from respective second electrical connectors to the third connector connectable to one voltage side of said valve unit to serve a double solenoid valve unit. The conductive valve line connects to an opposite voltage side of the double solenoid valve unit. The set of conductive valve lines includes a set of single solenoid valve lines extending from said first electrical connector and decremented one step for each third connector installed on the circuit board to the second electrical connector. The set of conductive valve lines includes a set of double solenoid valve lines extending from said second electrical connector and decremented two steps for each third connector installed on the circuit board to the first electrical connector. The set of single solenoid valve lines and the set of double solenoid valve lines that connect to the third connector are on the same surface of the circuit board on the third connectors.

BRIEF DESCRIPTION OF THE DRAWINGS

Reference now is made to the accompanying drawings in which.

DETAILED DESCRIPTION OF THE PREFERRED EMBODIMENT

Figure 1:
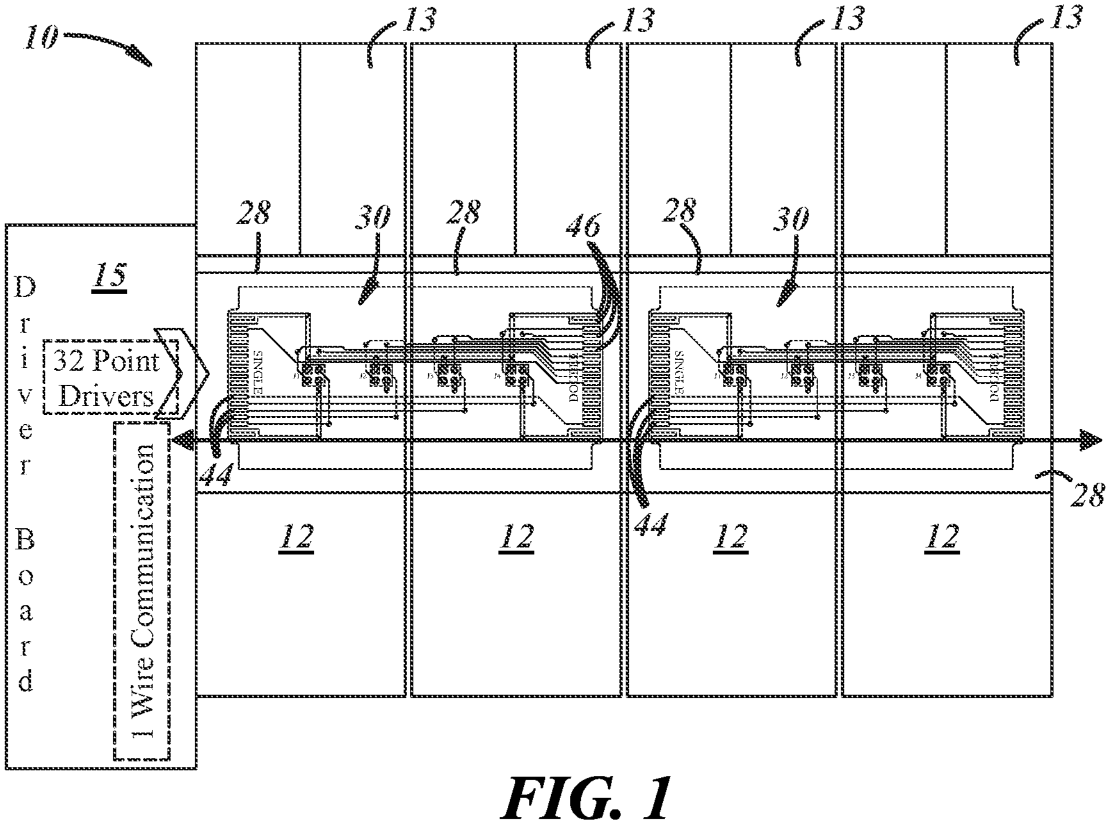
FIG. 1 is a schematic and side elevational view of one embodiment according to the invention illustrating a circuit boards mounted in manifold electrical pathway formed by plurality of valve units and actuator assemblies operably connected together.
Figure 2:
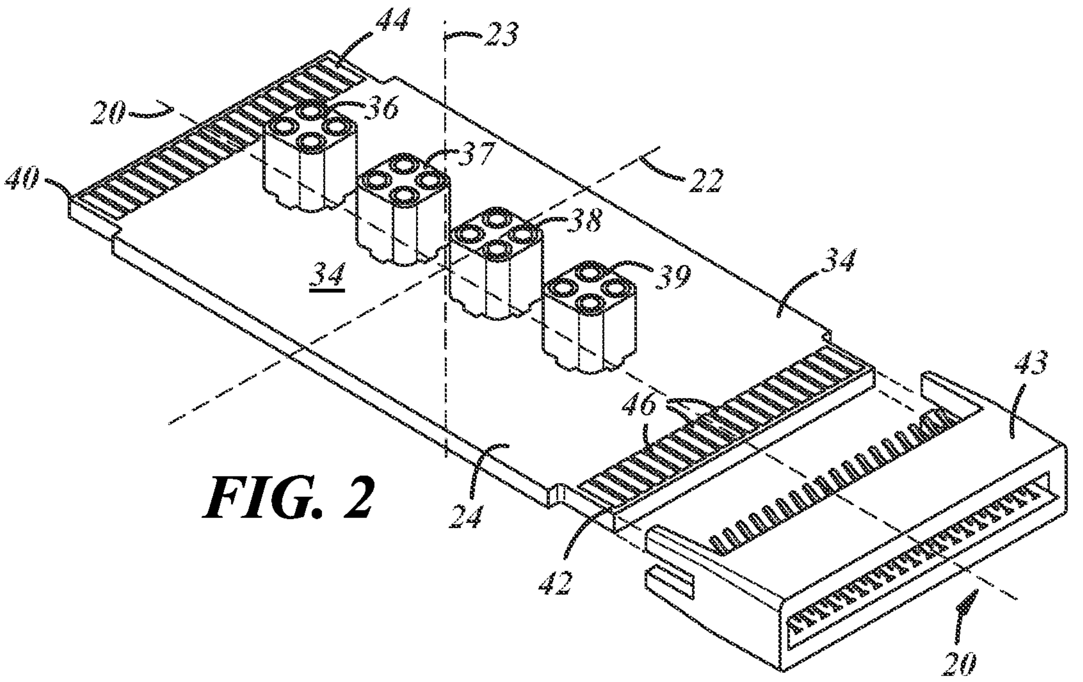
FIG. 2 is an enlarged perspective view of one printed circuit board assembly shown in FIG. 1.

Referring now to FIGS. 1 and 2, a fluid control system 10 is modular in nature and depending on the application has a varying number of valve manifold blocks 12 interconnected together. Only four manifold blocks 12 with eight valve units 13 are shown for simplicity of the drawings, i.e. each manifold block mounts two valve units. Some of the valve units 13 may be single solenoid operated and some valve units may be double solenoid operated. Double solenoid valve units are also referred to as dual solenoid valves. All blocks 12 are operably connected to a communication module 15.

Preferably, each valve manifold block 12 may accommodate two valve units 13 each being a single or double solenoid variety. It is possible that the manifold block can mount one valve unit 13 of the single solenoid variety and one valve unit 13 of the double solenoid variety. Each valve manifold block 12 has a passage 28 that receives a printed circuit board assembly 30 which will be described in more detail.

Figure 3:
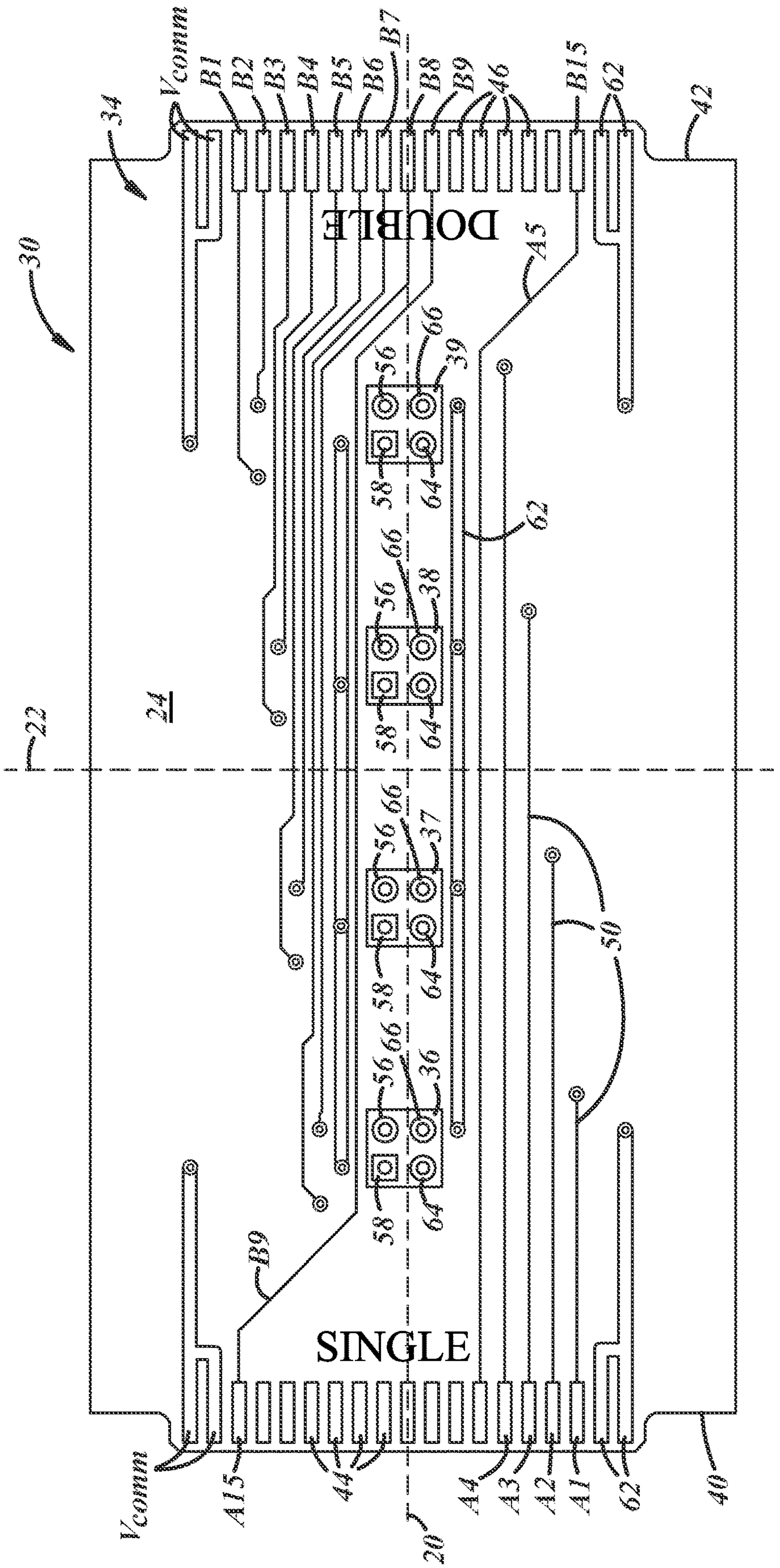
FIG. 3 is an enlarged plan view illustrating the front surface of the circuit board assembly shown in FIG. 2.
Figure 4:
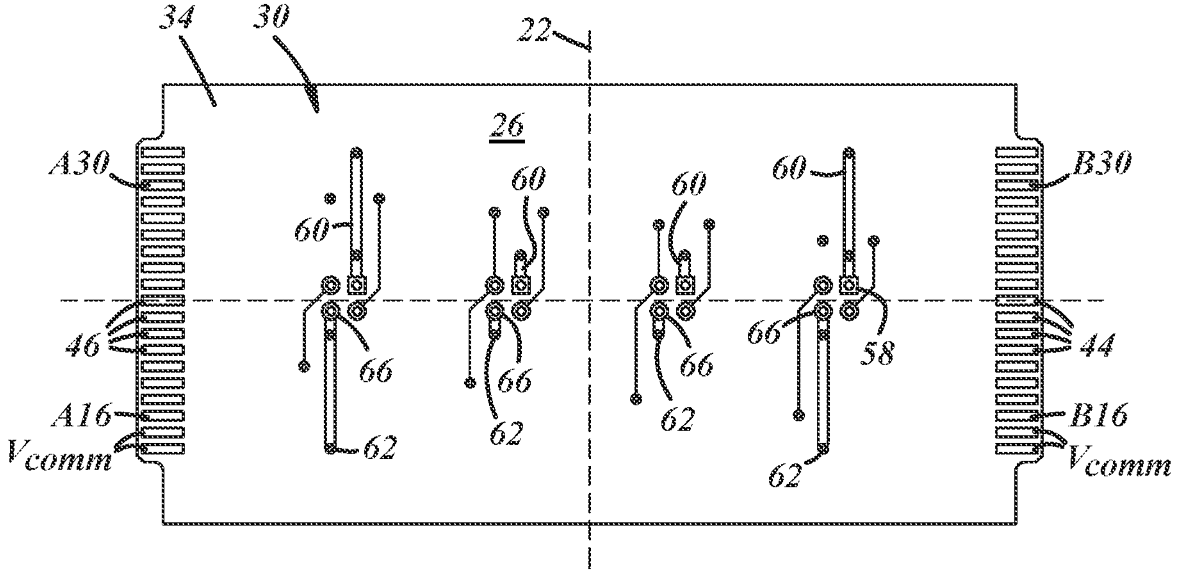
FIG. 4 is a enlarged plan view of the rear surface of the circuit board assembly shown in FIG. 2.

Referring now to FIGS. 3 and 4, the circuit board assembly 30 has a printed circuit board 34 with pin connectors 36, 37, 38, and 39 (often called j-pin connectors) mounted on a front surface 24 of the printed circuit board 34. Each pin connector is symmetrically mounted along the longitudinal central axis 20 of the circuit board 34. Further the set of pin connectors 36-39 are symmetrically positioned about the minor transverse axis 22 of the board 34. Preferably the j-pin connectors are equally spaced as well as being symmetrically positioned relative to the minor transverse axis 22 to accommodate uniformly spaced and positioned valve units. This symmetry provides that the circuit board assembly 30 can rotate about axis 23 that passes through the thickness of the board 34 and is transverse to both axis 20 and 22 as described in more detail later.

Each board 34 has a first edge 40 and second edge 42 with respective connectors in the form of electrical contacts 44 and 46. These contacts 44 and 46 may be traces printed directly on board 34. The contacts 44 and 46 are connected together by lines 50 also in the form of traces. As shown in FIG. 2, a standard bridge connector 43 electrically connects the aligned contacts 44 and 46 of adjacent boards 30 shown in FIG. 1 within the connectors 43.

Referring now to FIGS. 3 and 4, the contacts 44, 46, and lines 50 may be on both the front surface 24 and rear surface 26 of the board. The contacts 44, 46 and lines 50 are generally arranged to accommodate both single and double solenoid valves depending on how the circuit board is installed. As shown in FIGS. 3, the trace contacts 44 each have a specific position labeled A1, A2, A3 and connect to lines (50) on the circuit board. The illustrated circuit board 34 shows a capacity of thirty (30) electrical contacts at each edge 40, 42 which indicates the valve manifold using that circuit board is limited to a maximum of thirty single solenoid valves. The electrical connectors are also symmetrically spaced about the longitudinal axis 20. The circuit boards can be traced with more or less contacts and lines depending on the needed capacity and applications of the end user as long as the connectors are symmetrically spaced about the longitudinal axis 20.

The first four contacts A1-A4 lead to respective first pin socket contacts 56 at respective pin connectors 36, 37, 38, and 39. Each pin socket contact 56 is connectable to the respective solenoid valve unit 13 of the single solenoid variety. Each valve solenoid unit 13 is also respectively connected to contact pin socket 58 which is connected to the common voltage line 60 that leads to an electrical connector Vcomm with a common voltage. The Vcomm connectors are normally connected to a 24 volt supply to power all of the valve units 13 when the circuit is completed. As shown the first four contacts A1-A4 and the respective lines 50 are on the same front surface 24 of printed circuit board 34.

The remainder of the conductive valve lines 50 labeled A5-A30 on both surfaces 24 and 26 extend from one edge 40 to the second edge 42 and may be decremented four steps or positions from edge 40 to edge 42, i.e. one step for each valve unit of the single solenoid type. For example see trace A5 that leads to trace B15 which can then connect to trace A1 or B1 in a subsequent circuit board depending on the rotated position of the subsequent board 34.

Other lines 62 at the bottom of the circuit board can provide auxiliary power lines or function as a protective earth line or function as a serial communication line. Line 62 as well as the Vcomm line 60 extends through the circuit board without any decrementation of position.

Referring now to FIG. 3 describing the second edge 42, which when the circuit board 34 is rotated 180 degrees about the axis 23 becomes the left edge, each two electrical contacts 46 labeled B1 and B2 are connected to the pin connector 39, electrical contacts labelled B3 and B4 are connected to pin connector 38, electrical contacts labeled B5 and B6 are connected to pin connector 37 and electrical contacts labeled B7 and B8 are connected to pin connector 36. The respective contacts B1, B3, B5 and B7 are connected to first pin socket contact 56 of each respective connector 36, 37, 38, and 39 while contacts B2, B4, B6 and B8 are connected to third pin socket contacts 64 of each respective connector 36, 37, 38, and 39.

The pin socket contacts 56 and 64 are connected to the respective solenoids of each double solenoid valve unit 13. Line 62 which now is in the position to carry the common voltage is operably connectable to the opposite voltage side of each solenoid. Each valve solenoid unit 13 is also respectively connected to contact pin socket 66 which is now in the lower right position as shown in FIG. 3 to connect to the line 62 that is in the position to carry the common voltage. The connection between the contact in socket 62 is shown more clearly in FIG. 4.

The remainder of the conductive valve contacts 46 and lines 50 labeled B9-B30 on both surfaces 24 and 26 extend from the edge 42 to the edge 40 and are decremented eight steps or positions from edge 40 to edge 42, i.e. two steps for each valve unit of the double solenoid type. For example, see contact B9 which has its line stepped to A15 which can then connect to contact B1 in a subsequent board 34. The line 60 which functioned as the common voltage line for the single solenoid valves can now function as an auxiliary power lines, function as a protective earth line, or a rapid communication line.

The trace lines 50 leading to the connectors A6-A30 and B10-B30 have been omitted to simplify and clarify the drawings. These traces can be stepped and also switched from the from surface 24 to the rear surface 26 and back again as needed. It is also foreseeable that the line 60 or 62 depending on the rotated orientation of the circuit board about axis 23 can also function as a detection line that can be used to determine if the circuit board is a single board or a double board. The layout of the contacts A5-A30 and B8-B30 that do not connect to pin connectors 52-55, the detection line, and single serial communication line are fully described in U.S. Pat. No. 10,006,557 issued on Jun. 26, 2018 to DeCarolis which is hereby incorporated by reference. In addition an appropriate label "single" or "double" is place proximity to the respective edge 40 and 42.

Figure 5:
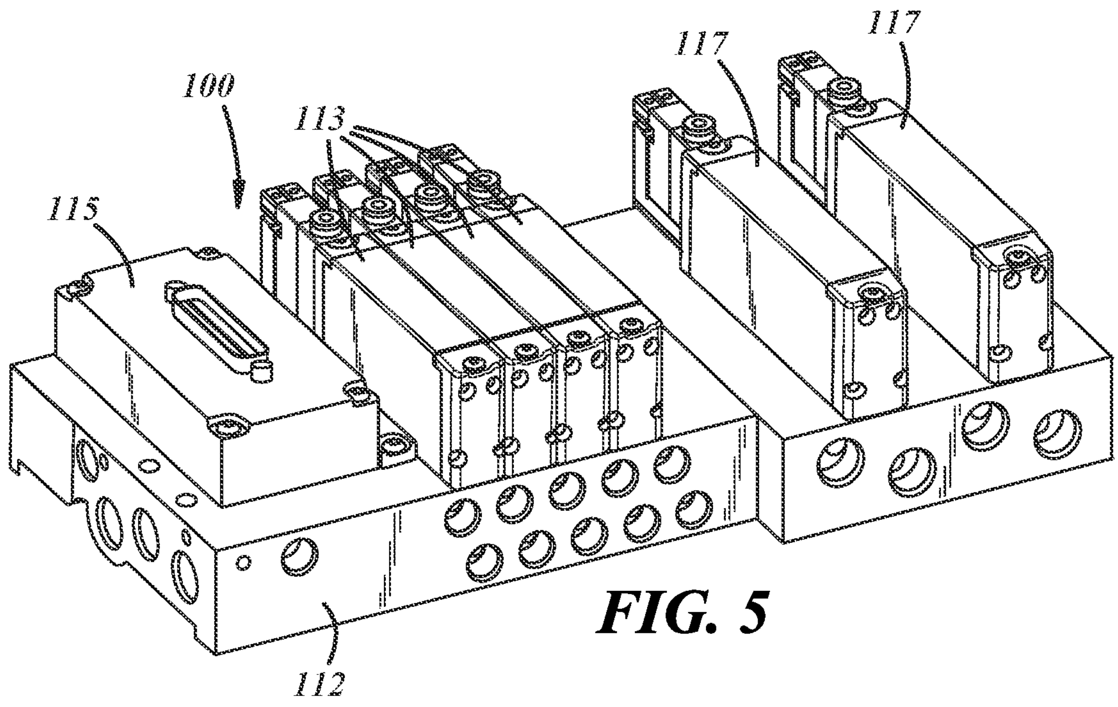
FIG. 5 is a perspective view of an alternative valve manifold incorporating another circuit board assembly as shown in FIGS. 6 and 7.
Figure 6:
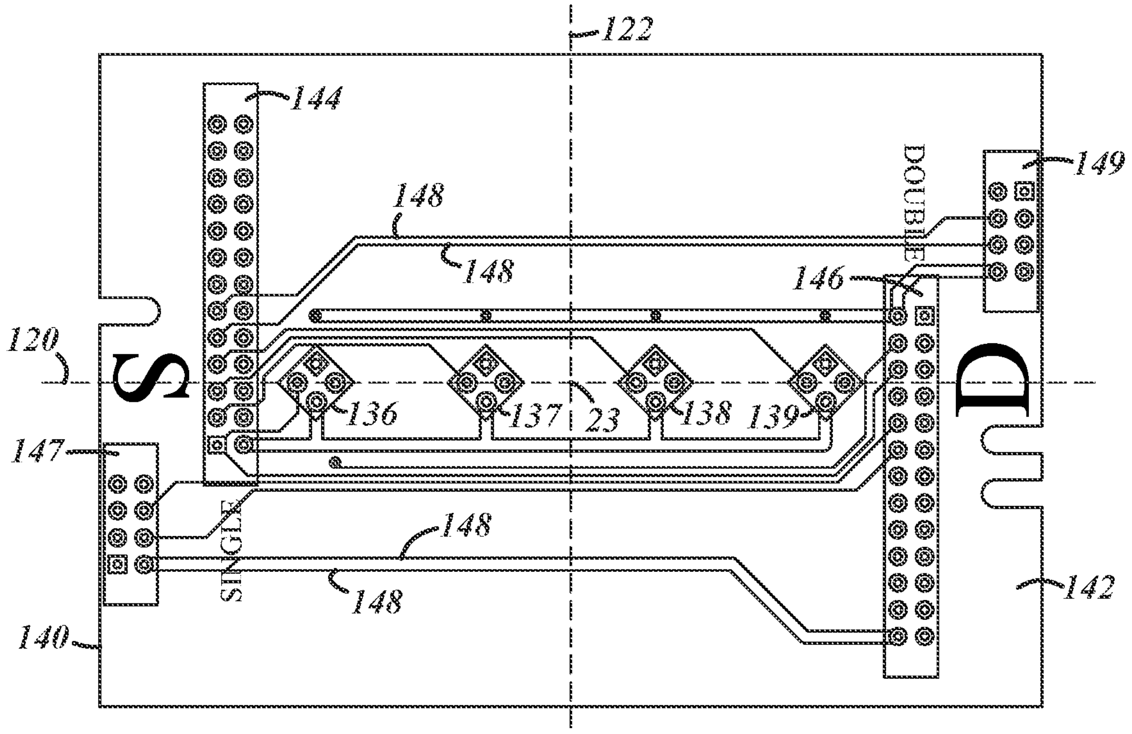
FIG. 6, is a plan view of a second embodiment of a circuit board assembly for use in the manifold assembly shown in FIG. 5 illustrating a front surface of the circuit board.
Figure 7:
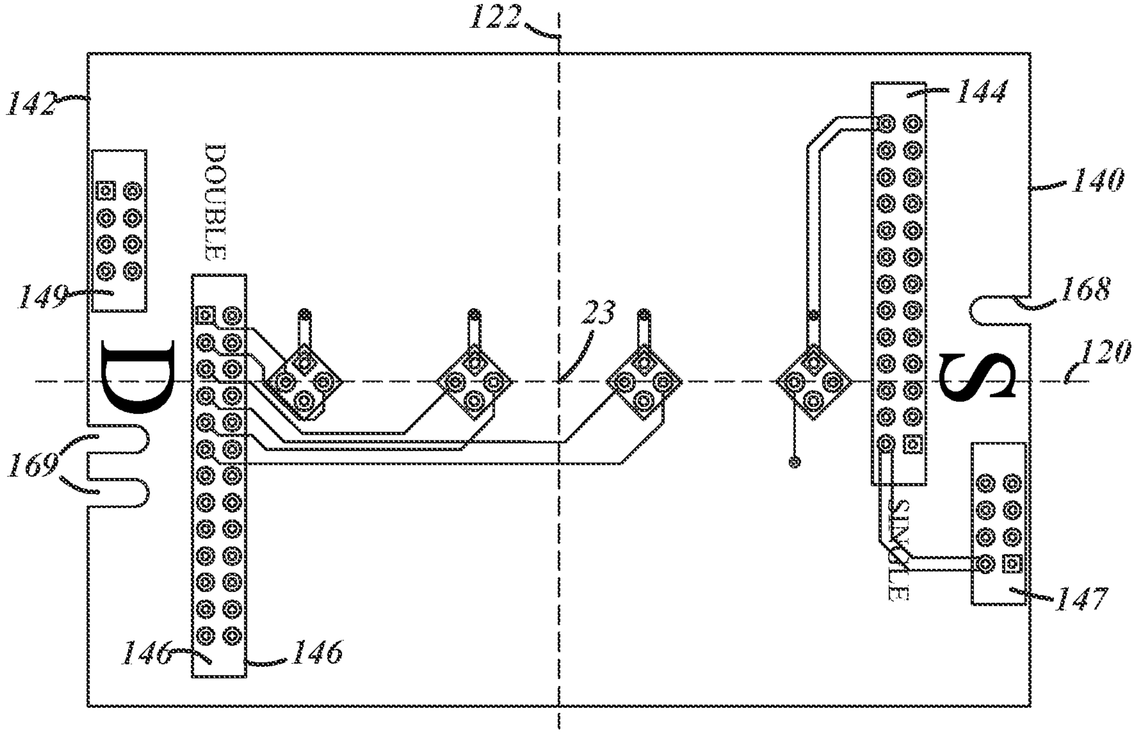
FIG. 7 is a plan view similar of the rear surface of the circuit board assembly shown in FIG. 6.

Referring now to FIGS. 5-7, an alternative embodiment is shown. In this embodiment, the fluid control assembly 100 may have an integrally formed manifold 112 with valve units 113 mounted on top. A communication module 115 may be mounted near one end. A single board 134 shown in FIGS. 6 and 7 may extend through the entire manifold. The main difference between this embodiment and the previously described embodiment is that instead of edge connectors or edge traces 44 and 46, the circuit board has pin connectors 144 and 146 at each end that connect to the traces 148. The pin connectors are mounted on the same surface at the pin J-connectors 136, 137, 138, and 139. The J-pin connector are at a 45° rotated angle but still provide the needed symmetry about both the longitudinal axis 120 and the transverse axis 122. Extra pin contacts are spares and are there for longer boards with more valve stations. Each board has at each edge a separate pin connector 147 and 149 that can be used to attach to additional valve units 117 connected through other circuit boards. Only two traces 148 are shown extending out of each separate connector 147 and 149. Up to six traces for each round pin connector can extend between connectors 147 and 146 and between pin connectors 148 and 149.

Each edge may have an "S" or a "D" indication to inform an operator of the proper rotated orientation for attachment to single or double valve units. Other indications such as a single notch 168 or double notch 169 can also be placed at a respective edge 140 and 142 to indicate the single or double valve application.

The advantage of either reversible embodiment is that the circuit board can be used for single valve units or double valve units by proper rotation of the circuit board. The manifold can have both single and double valves in any desired order with the proposed rotation of each board in the manifold. Furthermore, these circuit boards can be attached to other circuit boards either via the card edge connector 43 or through pin connectors. In addition, these reversible boards can also be used in conjunction with standard non-reversible commercially available circuit boards of either the single or double valve station variants.

Other variations and modifications are possible without departing from the scope and spirit of the present invention as defined by the appended claims.

The embodiments in which an exclusive property or privilege is claimed are defined as follows:

1. A fluid valve manifold characterized by:

said fluid valve manifold having an electrical conduit extending therethrough for receiving a circuit board assembly that actuates a plurality of valve units mounted to the fluid valve manifold;

said circuit board assembly having a circuit board and electrical connectors thereon, said circuit board assembly being reversibly mountable to a first position or second position in said electrical conduit such that a respective set of first electrical connectors at a first end or a second set of electrical connectors at a second end opposite that of said first end may be in position to receive electrical signals through said respective connectors;

the circuit board having a set of conductive valve lines connected to and extending between said respective set of first electrical connectors and said set of second electrical connectors at said first end and opposite second end of said circuit board;

a conductive valve line extending from a respective first electrical connector to at least one third connector on a first surface of said circuit board operably leading to one voltage side of one of said valve units to serve a single solenoid valve unit with a conductive common line connected to said third connector being operably connected to an opposite voltage side of said single solenoid valve unit and also connected to the first electrical connector and second electrical connector when said circuit board assembly is in said first position; and two conductive valve lines extending from respective second electrical connectors to said at least one third connector leading to one voltage side of one of said plurality of valve units to serve a double solenoid valve unit with the conductive common line connected to said third connector being operable connected to an opposite voltage side of said double solenoid valve unit and also connected the first electrical connector and the second electrical connector when said circuit board assembly is in said second position.

2. A fluid valve manifold as defined in claim 1 further characterized by:

said third connector being mounted on one surface of said circuit board at a central longitudinal axis of said circuit board.

3. A fluid valve manifold as defined in claim 2 further characterized by:

a plurality of third connectors all being mounted along the central longitudinal axis of said circuit board and being symmetrically positioned about a central transverse axis along said width of said circuit board.

4. A fluid valve manifold as defined in claim 1 further characterized by:

said set of conductive valve lines comprising a set of single solenoid valve lines extending from said first electrical connector and decremented one step for a respective third connector on said circuit board to said second electrical connector; and said set of conductive valve lines comprising a set of double solenoid valve lines extending from said second electrical connector and decremented two steps for each third connector on said circuit board to said first electrical connector.

5. A fluid valve manifold as defined in claim 4 further characterized by:

said sets of single and solenoid valve lines and double solenoid valve lines being on a respective front surface and back surface of said circuit board.

6. A fluid valve manifold as defined in claim 4 further characterized by:

said second electrical connector of said printed circuit board being constructed to be connectable to a first electrical connector of a sequentially connected printed circuit board; and said first electrical connector of said printed circuit board being constructed to be connectable to a second electrical connector of a sequentially connected printed circuit board.

7. A fluid valve manifold as defined in claim 5 further characterized by:

a communication circuit line being on a surface of said circuit board, extending from said first electrical connector and extending to said second electrical connector without any decrementation.

8. A fluid valve manifold as defined in claim 4 further characterized by:

a communication circuit line being on a surface of said circuit board, extending from said first electrical connector and extending to said second electrical connector without any decrementation.

9. A circuit board assembly for a fluid valve manifold characterized by:

a circuit board assembly having a plurality of connectors on one surface of a circuit board for connection to at least one valve unit mounted to the fluid valve manifold;

said circuit board assembly having a plurality of conductive valve lines extending from a first end to a second opposite end being reversibly mountable to a first position or second position to said fluid valve manifold such that a respective set of first electrical connectors at said first end or a second set of electrical connectors at said opposite second end that of said first end may be in position to receive electrical signals through said respective connectors;

the circuit board having a set of conductive valve lines connected to and extending between said respective set of first electrical connectors and said set of second electrical connectors at said first end and opposite second end of said circuit board;

a conductive valve line extending from a respective first electrical connector to at least one third connector on a first surface of said circuit board operably leading to one voltage side of one of said at least one valve unit to serve a single solenoid valve unit with a conductive common line connected to said at least one third connector being operably connected to an opposite voltage side of said single solenoid valve unit and also connected to the first electrical connector and second electrical connector when said circuit board assembly is in said first position; and two conductive valve lines extending from respective second electrical connectors to said third connector leading to one voltage side of one of said at least one said valve unit to serve a double solenoid valve unit with the conductive valve line connected to said at least one third connector being operable connected to an opposite voltage side of said double solenoid valve unit and also connected the first electrical connector and the second electrical connector when said circuit board assembly is in said second position.

10. A circuit board assembly as defined in claim 9 further characterized by:

said third connector being mounted on one surface of said circuit board at a central longitudinal axis of said circuit board.

11. A circuit board assembly as defined in claim 10 further characterized by:

a plurality of third connectors all being mounted along the central longitudinal axis of said circuit board and being symmetrically positioned about a central transverse axis along said width of said circuit board.

12. A circuit board assembly as defined in claim 9 further characterized by:

said set of conductive valve lines comprising a set of single solenoid valve lines extending from said first electrical connector and decremented one step for a respective said at least one third connector on said circuit board to said second electrical connector; and said set of conductive valve lines comprising a set of double solenoid valve lines extending from said second electrical connector and decremented two steps for a respective said at least one third connector on said circuit board to said first electrical connector.

13. A circuit board assembly for a fluid valve manifold characterized by:

a circuit board assembly having a plurality of connectors on a surface of a circuit board for connection to at least one valve unit mounted to the fluid valve manifold;

said circuit board assembly having a set of conductive valve lines extending from a first end to a second end opposite that of said first end being reversibly mountable to a first position or second position in to said fluid valve manifold such that a respective set of first electrical connectors at said first end or a second set of electrical connectors at said opposite second end that of said first end may be in position to receive electrical signals through said respective connectors;

said set of conductive valve lines includes a conductive valve line extending from a respective first electrical connector to a third connector of said circuit board operably leading to one voltage side of said valve unit to serve a single solenoid valve unit with a conductive common line connected to at least one third connector being operably connected to an opposite voltage side of said single solenoid valve unit and also connected to the first electrical connector and second electrical connector when said circuit board assembly is in said first position; and said set of conductive valve lines includes two conductive valve lines extending from respective second electrical connectors to said respective at least one third connector leading to one voltage side of said valve unit to serve a double solenoid valve unit with the conductive valve line connected to said at least one third connector being operable connected to an opposite voltage side of said double solenoid valve unit and also connected the first electrical connector and the second electrical connector when said circuit board assembly is in said second position;

said set of conductive valve lines comprising a set of single solenoid valve lines extending from said first electrical connector and decremented one step for a respective said at least one third connector on said circuit board to said second electrical connector;

said set of conductive valve lines comprising a set of double solenoid valve lines extending from said second electrical connector and decremented two steps for a respective said at least one third connector on said circuit board to said first electrical connector; and said set of single solenoid valve lines and said set of double solenoid valve lines being on said surface of said circuit board.

14. A circuit board assembly as defined in claim 13 further characterized by:

said set of single solenoid valve lines and said set of double solenoid valve lines each also being on an opposite surface of said circuit board.

* * * * *